Patented July 29, 1930

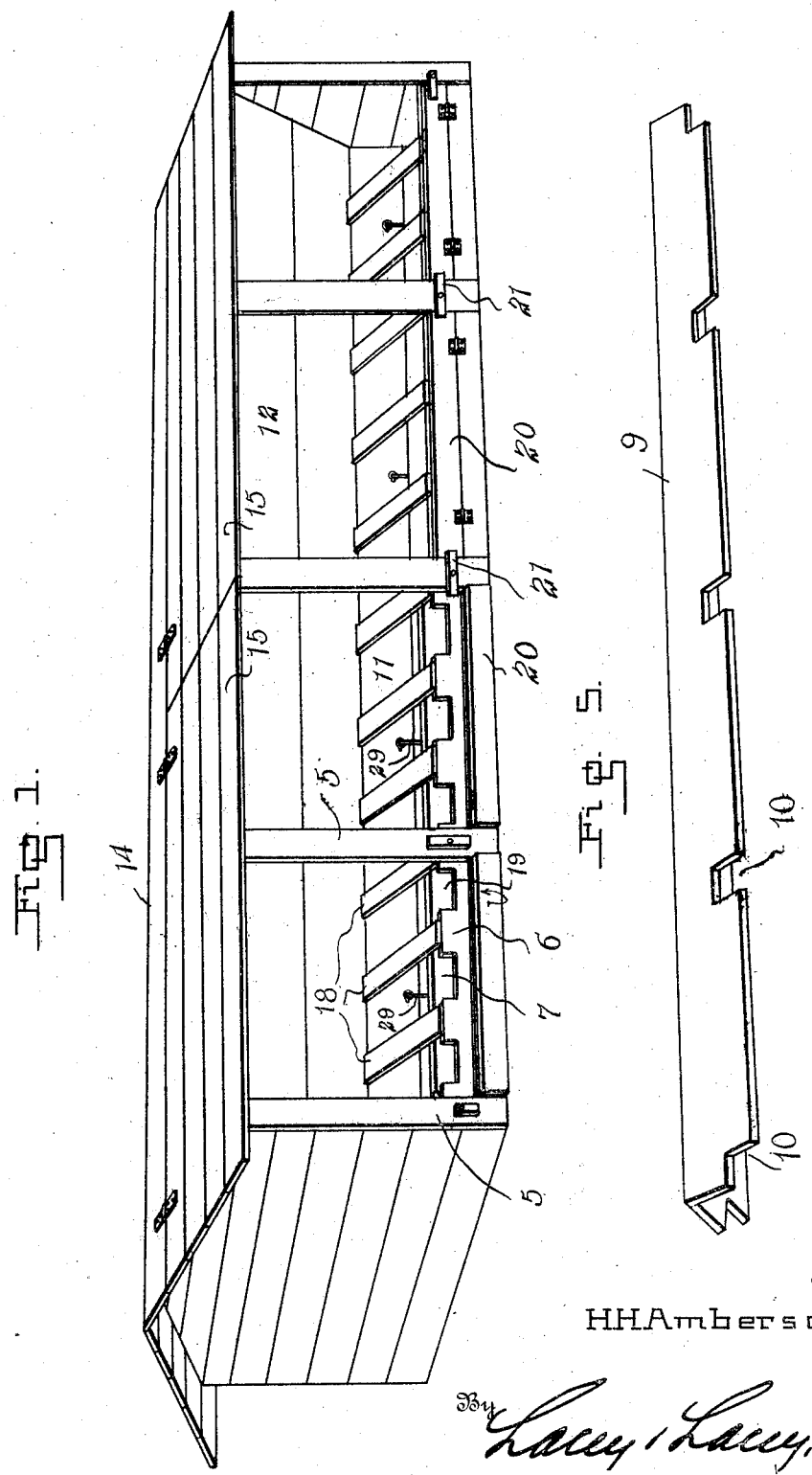

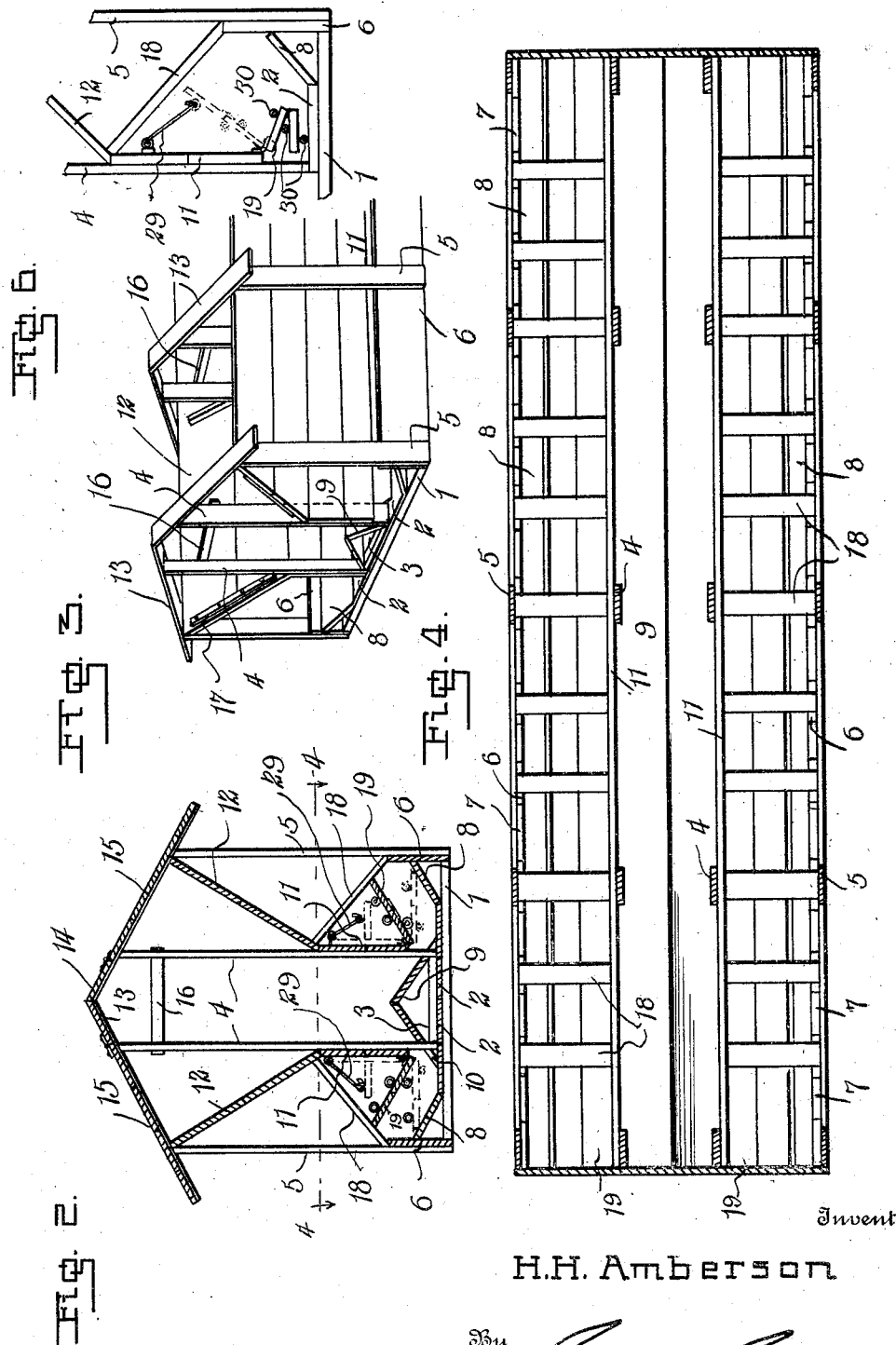

1,771,701

UNITED STATES PATENT OFFICE

HOWARD H. AMBERSON, OF BELGRADE, MONTANA

HOG FEEDER

Application filed March 30, 1928. Serial No. 266,009.

This invention has for its object the provision of an inexpensive and durable feed rack by the use of which feed of any kind may be fed automatically to a trough or troughs within which it may be easily reached by live stock. The invention is intended more particularly for use in feeding hogs and includes means whereby access of small pigs to the feeding compartments may be prevented while the larger hogs may be permitted to feed. The invention also has for its object the provision of a structure whereby crowding of the pigs or hogs will be prevented and the feed will be protected from the effects of the weather. These stated objects, and other objects which will incidentally appear in the course of the following description, are attained in such an apparatus as is illustrated in the accompanying drawings, and the invention resides in certain novel features which will be particularly pointed out in the appended claims.

In the drawings:

Figure 1 is a perspective view of a feeding rack embodying the invention;

Fig. 2 is a transverse vertical section;

Fig. 3 is a detail perspective view showing one end of the structure before the end boards and the roof are put in place;

Fig. 4 is a horizontal section;

Fig. 5 is a detail perspective view of the deflector or spreader, and

Fig. 6 is a detail showing possible adjustments of the covers.

In carrying out the invention, I provide a plurality of sills 1 which are arranged in parallelism and disposed equi-distantly. Upon the upper side of these sills, floor boards 2 are rigidly secured to extend the full length of the proposed feeder, and upon these boards at intervals are secured transverse cleats or stop blocks 3, said cleats having a length less than the width of the floor. To the ends of these cleats 3 are secured uprights or posts 4 and to the outer ends of the several sills other posts or uprights 5 are secured. By referring to Figs. 2 and 3 more particularly, it will be noted that the floor has a width less than the length of the sills 1 so that a space is left between the side edges of the floor and the posts or uprights 5. Extending the full length of the feeder and secured to the ends of the sills and to the uprights 5 are rails 6 which are constructed in their upper edges with notches 7 to accommodate the heads of young pigs and also separate the pigs while they are feeding. Disposed between the side edges of the floor and the respectively adjacent rails 6 are inclined floor boards 8 which serve as walls to prevent the feed flowing outwardly beyond the feeder and also to cut off sharp angles in which the feed may lodge and become inaccessible, it being evident that the inclined wall boards support the feed in such a manner that the entire body thereof may be reached by the feeding animals. Between the inner posts or uprights 4 and extending longitudinally of the feeder is a spreader or deflector 9 which, as shown clearly in Fig. 5, consists of boards secured together in angular relation so as to present an inverted V form in cross section, and in the outer side edges of this deflector or spreader are notches 10 whereby the spreader is adapted to fit around the lower ends of the uprights and have its lower edges project beyond the uprights to direct the feed forwardly within the troughs formed by the floor 2 and the boards 8. Side boards 11 are secured to the outer sides of the posts 4 to define the lower portion of a hopper having the deflector or spreader 9 at its bottom, and extending obliquely outwardly and upwardly from the upper edges of the side boards 11 are other side boards 12 which form the sides of the upper portion of the hopper and give the same a flared formation so that the feed may be easily placed therein. The side boards 12 extend to the upper ends of the outer posts 5 to which they are secured, and carried by the posts are rafters 13 upon which is secured a roof 14 having doors 15 provided at its sides. The upper ends of the posts 4 are connected by braces 16 to attain the desired rigidity in the structure and reinforcing cleats 17 may be secured upon the wall boards 12, as will be understood. Extending between the upper edges of the rails 6 and the sides of the hopper are inclined divider bars 18 which are spaced apart longitudinally of the feeder and serve to mark off the feeding troughs into spaces each of which will accommodate the head of one feeding animal thereby preventing crowding of the animals and also insuring a fair share of the feed to each animal. Covers 19 are hingedly mounted upon the sides 11 at the lower edges of the same and are adapted to extend across the feeding troughs, as indicated by the dotted lines in Fig. 2, or to extend upwardly, as shown in full lines in said figure and be held to the divider bars 18 by hooks 29 or any other convenient fastening. By this arrangement the feeding of the animals may be entirely prevented, except at the proper feeding times, and by setting the covers in the position shown in full lines in Fig. 2, the larger hogs will be prevented from feeding. If it be desired to permit the larger hogs to feed, the covers may be swung upwardly so as to lie against the sides 11 and be fastened thereto, as shown in the upper dotted lines in Fig. 2, thereby rendering the feeding troughs fully accessible. When the hogs are feeding, it is, of course, desirable to prevent the pigs from reaching the feeding troughs with the hogs as they would be simply crowded out and would be very apt to be injured. For this purpose, I provide the drop boards 20 which are hinged to the outer sides of the rails 6 and will expose the notches 7 when they are lowered but will cover said notches when raised, as shown at the right in Fig. 1. To support these boards in their raised positions, buttons 21 are mounted upon the adjacent posts 5 and are adapted to extend over the ends of the drop boards, as will be understood.

It will be noted that the covers are split longitudinally approximately midway their edges and the two parts are connected by hinges so that they may fold together or be extended in flush relation. They are also provided with eyes 30 with which the hooks 29 may be engaged to support the covers in various positions, and it will be understood that by properly setting the drop boards and the covers the younger animals will be separated and protected from the larger animals while ample feeding of all the animals without waste will be provided. If the covers be arranged, as shown in full lines in Fig. 2, the smaller stock may feed but the larger stock will be kept from feeding, while if they be set, as indicated by the upper dotted lines in Fig. 2 or by the dotted lines in Fig. 6, the larger stock may feed, the smaller stock being shut out by raising the drop boards 20. Under some conditions, it may be found desirable to fold the covers and drop them to the floor, as shown in Fig. 6 in full lines, in which position the eyes 30 on the outer sections will maintain the covers out of actual contact with the floor, so that the animal may work his snout under the covers and obtain feed and also impart some vibration to the cover which will agitate the feed and facilitate the flow of the same.

My improved structure may receive any kind of feed, the feed being placed in the hopper through the top of the same and gravitating to the spreader 9 by which it will be deflected outwardly below the edges of the sides 11 and be received in the troughs defined by the deflector and floor and the outer boards 8. The animals may reach the feed from the edges of the rails 6 and will be kept separated by the divider bars 18 so that crowding cannot occur while each animal will be permitted to obtain a sufficient quantity of the feed. The apparatus can be easily built at a low cost and is adapted for use either indoors or outdoors. When used outdoors, the roof of the structure and the covers 19 will very completely protect the feed against the elements so that it will always be in a proper condition to be consumed by the stock. If desired, the device may be mounted on skids so that it may be easily moved from place to place.

Having thus described the invention, I claim:

1. A stock feeder comprising a hopper, troughs extending along the sides of the hopper, rails at the outer sides of the troughs having notches in their upper edges, divider bars extending from the upper edges of the rails at points between the notches therein to the sides of the hopper, drop boards hinged to the outer sides of the rails and adapted when raised to cover the notches therein, the upper edges of the drop boards being flush with the top edges of the rails, and means for holding the drop boards in raised position.

2. A stock feeder comprising a floor, posts rising from the floor at opposite sides of the medial longitudinal plane thereof, other posts spaced from the side edges of the floor, a roof supported by the posts and including hinged doors, rails extending along the lower ends of the outer posts, inclined wall boards extending from said rails to the outer edges of the floor, side boards secured to the inner posts adjacent the lower portions of the same, inclined side boards extending from the upper edges of the first-mentioned side boards to the upper ends of the outer posts, divider bars extending from the rails to the side boards, a deflector secured on the floor between the inner posts and projecting outwardly below the lower edges of the first-mentioned side boards, and foldable covers hinged at their inner edges to the lower edges of the side boards below the divider bars adapted to extend from the lower side boards to the rails or to the divider bars or be swung up against said side boards or rest folded upon the floor.

In testimony whereof I affix my signature.

HOWARD H. AMBERSON. [L. S.]